United States Patent Office 3,023,619
Patented Mar. 6, 1962

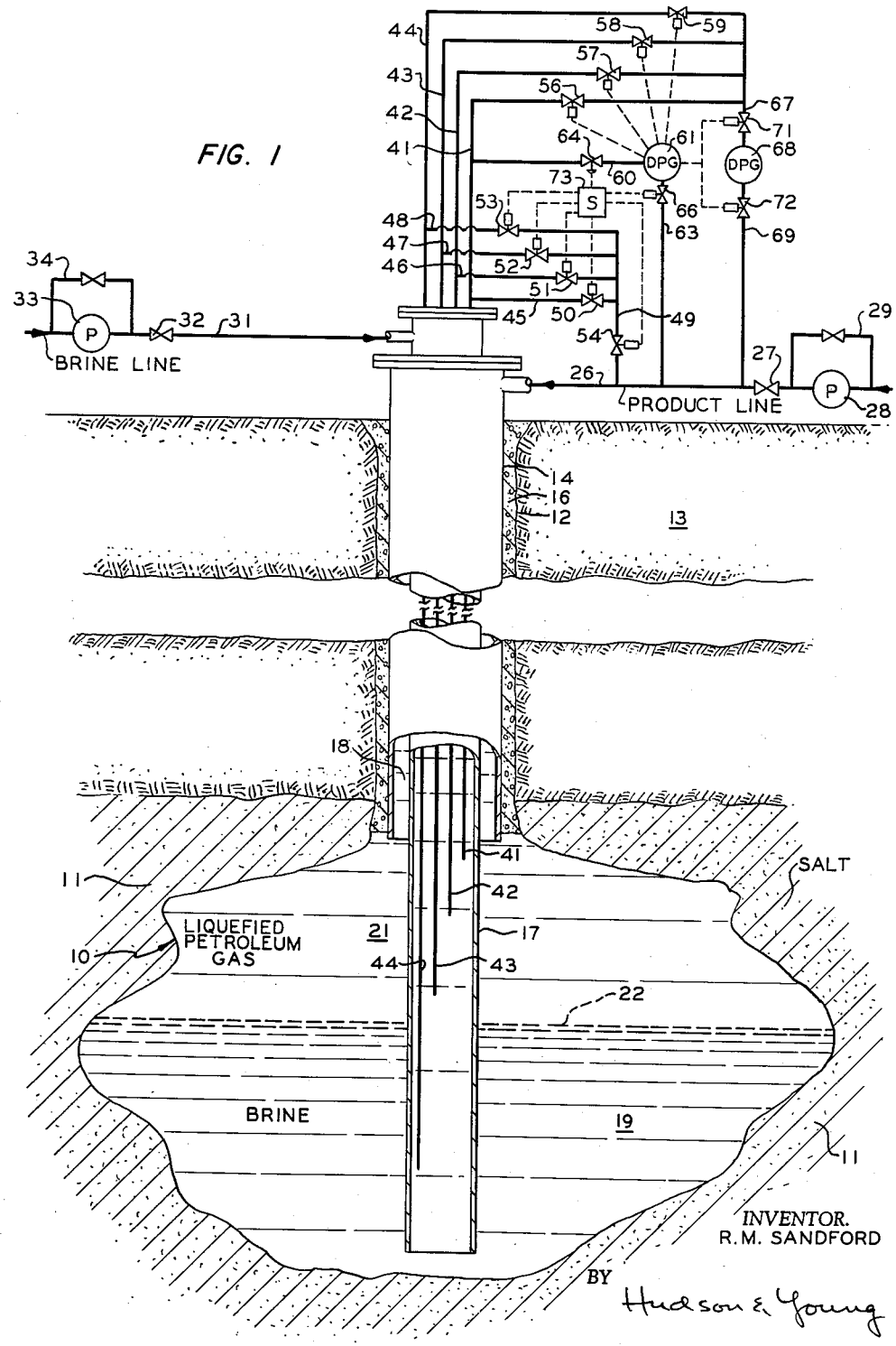

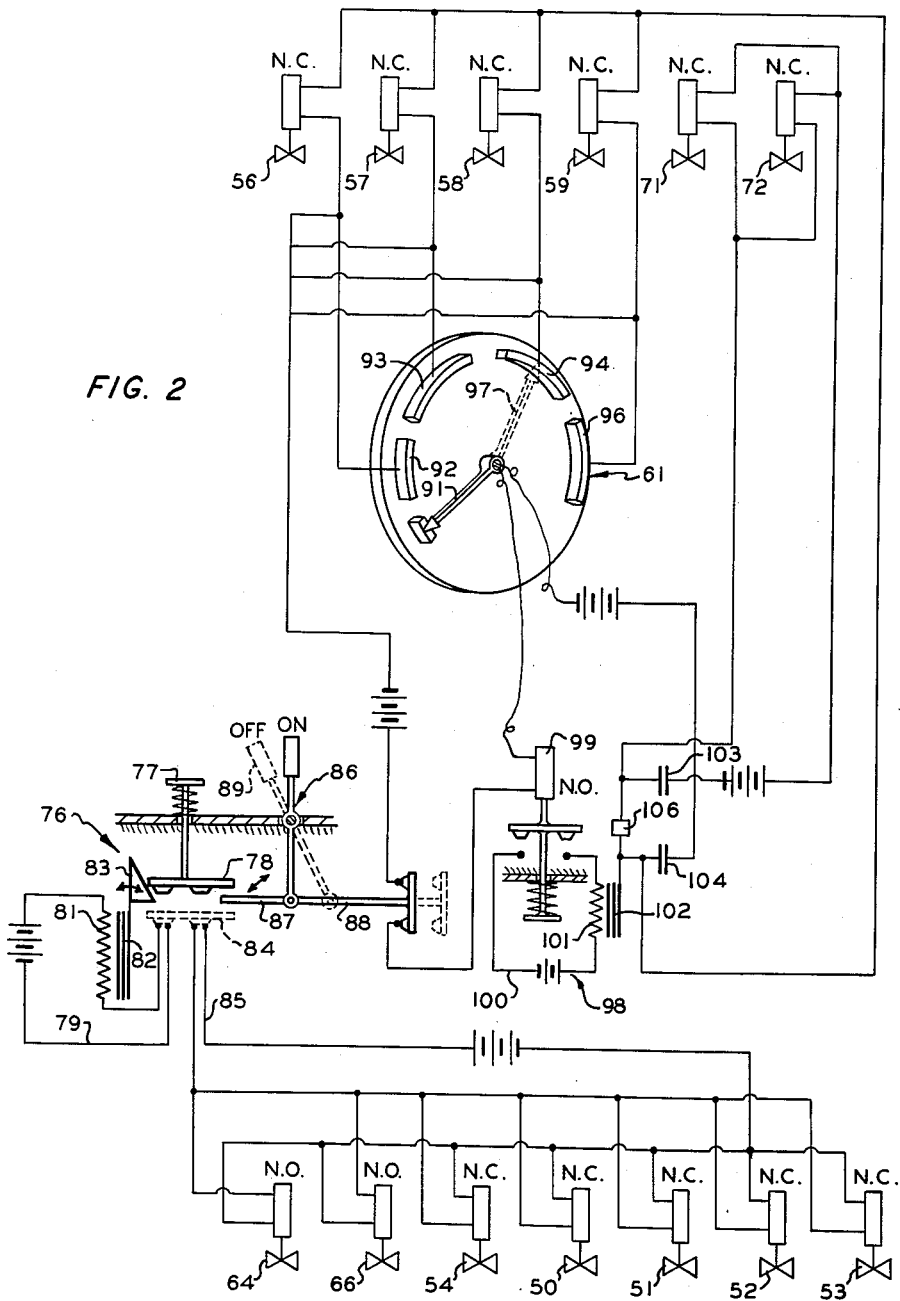

3,023,619
UNDERGROUND STORAGE
Robert M. Sandford, Bartlesville, Okla., assignor to Phillips Petroleum Company, a corporation of Delaware
Filed Apr. 25, 1960, Ser. No. 24,511
9 Claims. (Cl. 73—299)

This invention relates to the underground storage of liquids such as liquefied petroleum gas. In another aspect it relates to a method and apparatus for accurately locating the interface in an underground storage cavern or the like between two immiscible liquids having different densities, such as the interface formed between a pool of brine and a layer of liquefied petroleum gas (hereinafter termed L.P.-Gas) stored thereabove in said cavern.

Constantly expanding production of liquids for the industries of this country and elsewhere has created a definite problem in providing suitable storage facilities for these liquids. In the petroleum industries, in particular, the problem of storage of liquids such as L.P.-Gas is presently an urgent one due to the cost of storage in surface equipment, such as steel tanks, and due to the massive construction required to withstand the vapor pressure of such stored liquids. Also adding to this problem of adequate storage facilities is the fact that many industries, particularly the L.P.-Gas industry, experience seasonal peak loads in the requirements of their products and corresponding seasonal slack periods. These fluctuations in requirements require large storage facilities and the advantages of storing such liquids in underground storage caverns have lately come to the attention of the industry.

These underground storage caverns are generally formed in impermeable earth formations either by conventional mining methods or, in some cases, by dissolving material with aqueous solvents or the like to create a storage space in soluble underground formations, for example, in salt formations or domes. The resulting caverns are less expensive to provide than would be an equal volume of orthodox surface storage space and have proven their value in the storage of liquids such as L.P.-Gas and the like. After formation of the cavern, a pool of brine or other displacing liquid normally occupies the lower portion of the cavern and the product to be stored occupies the space in the upper portion of the cavern above the displacing liquid. Since the displacing liquid and stored product are generally immiscible and have different densities, an interface forms between these two liquids.

It is often necessary to know the location and keep track of the interface between the displacing fluid and the stored product in the cavern. For example, in order to determine the shape and size of a cavern, the amount of product stored in the cavern, etc., it is necessary to first locate the interface. Moreover, it is often necessary to know the location of the interface, so as to be able to maintain the level of liquids in the cavern, and to prevent stored product from passing up through the bottom of the wash pipe or eductor tubing which depends within the cavern. Because the cavern is located a substantial depth below the ground surface, the cavern's access bore is relatively small, and the shape of the cavern is often irregular, many of the prior art methods of locating the interface level or depth have been found wanting.

Accordingly, an object of this invention is to locate accurately the interface in an underground storage cavern or the like between two immiscible liquids having different densities. Another object is to provide a method and apparatus for locating said interface in spite of the relative inaccessibility of the cavern, the relatively small cavern access bore, and the irregular shape of the cavern. Another object is to provide apparatus which will indicate at the surface the location of said interface with accuracy and without requiring costly equipment. A further object is to provide a method and apparatus which will locate said interface in an easy, inexpensive manner and thereby make it possible to maintain accurate control over the level of liquids in the cavern. Other objects and advantages of this invention will become apparent from the following discussion, appended claims and drawings in which:

FIGURE 1 is a schematic elevational view in partial section of an underground storage cavern with associated means necessary to carry out the subject invention; and FIGURE 2 schematically illustrates electrical circuitry and associated valves operated and controlled thereby.

Referring now to the drawing, in which like parts have been designated with like reference numerals, and initially to that embodiment illustrated in FIGURE 1, a sealed, fluid-filled underground storage cavern generally designated 10 as shown. Cavern 10 is formed within a soluble underground formation 11, such as a salt formation. The practice of this invention is particularly applicable and accurate where the ratio of the cavern height to the total depth beneath the surface of the ground is less than 1/3. This cavern 10 can be formed by the first drilling access bore or bore hole 12 from the surface of the ground through relatively insoluble overlying formations 13, such as surface soil, shale, limestone, sandstone, etc., and then into the top of the soluble formation 11. Following the drilling of the access bore 12, casing 14 is then inserted in the bore hole and set or secured therein by means of cement 16 so as to form a fluid-tight seal. Following the cementing of casing 14, the bore hole is drilled at a reduced diameter to the ultimate location of the bottom of the subsequently formed cavern. Depending within casing 14 in annularly spaced relation therewith is a tubing or eductor pipe 17, the lower end of the pipe 17 being positioned near the bottom of the bore hole. Alternatively, another tubing (not shown) can be suspended within the cavern in concentric relation with tubing 17, this other tubing serving to protect the inner tubing 17 during the washing operation. The salt in formation 11 is then dissolved by circulating the solvent, such as fresh water, down through tubing 17, the resulting solution or brine formed by the action of the solvent on the salt formation being removed to the surface via the annulus 18 formed between casing 14 and tubing 17. It is advisable in many cases to occasionally reverse the circulation, that is, by pumping the solvent down through the annulus 18 and withdrawing the resultant solution from the progressively enlarged cavern upwardly to the surface via tubing 17. In many cases it is often desirable to protect the roof of the cavern and the casing foot, and control in some measure the shape of the cavern, by introducing a protective blanket of hydrocarbon into the cavern and allowing it to float on top of the resulting pool of solution or brine 19. Suitable protective hydrocarbons include any of those which are immiscible with the wash solution and lighter than the wash solution, for example, L.P.-Gas or hydrocarbon material like that of the product subsequently stored in the cavern. The resulting cavern generally will have an irregular shape, such as that shown in the drawing, due to the fact that formation 11 may have some relatively insoluble materials embedded therein, such as anhydrite or gypsum, or may contain some relatively insoluble shale stringers, or its irregular shape may be due to variations in mining or washing operations. However, the cavern may have a regular shape, such as that of an upright or inverted cone, or can be somewhat cylindrical in shape.

After the cavern has been formed, product 21, such as

L.P.-Gas or other highly volatile and normally gaseous hydrocarbon, is then introduced in the cavern, for example, by pumping it down through annulus 18, the resulting displaced wash solution 19 being removed from the cavern via tubing 17, and an interface 22 being formed between product 21 and brine 19. When it is desired to remove product 21 from the cavern this can be done by introducing brine via tubing 17 and removing the thus displaced product via annulus 18.

As mentioned hereinbefore it is often necessary to locate the interface 22 formed between the wash solution or brine 19 and the stored product 21. According to the practice of one embodiment of this invention, the annulus 18 communicates at the upper end of casing 14 with a product conduit 26 having a valve 27 therein and operatively connected to a product pump 28. A valved bypass line 29 is preferably operatively connected in conduit 26 so as to bypass pump 28. The upper end of tubing 17 is operatively connected to a brine or solution conduit 31 which is similarly provided with a valve 32, and thereafter communicating with a pump 33 and valved bypass line 34.

As mentioned above, underground storage caverns are generally located a substantial distance below the ground surface and are not readily accessible. For example, the top of the cavern may be at a depth of 2000 feet and the bottom at a depth of 2300 feet. The difference in pressure between a point at ground surface and the interface between the displacing liquid and stored product can vary over a wide range. A single differential pressure gauge is not generally accurate over this wide range and if an attempt is made to locate the interface with such equipment, serious errors in locating the interface level or depth can occur. For example, the use of such equipment can result in the interface level being erroneously determined as far above or far below the true interface level. Such errors will result in very large errors in determining cavern shape or amount of product in storage. These errors in interface level are substantially minimized, reduced, or eliminated by the practice of this invention.

According to this invention, referring again to FIGURE 1, a plurality of small diameter pipes are suspended within eductor pipe 17, the lower ends of said plurality of pipes being open and terminating at different, and preferably regularly-spaced, known elevations or depths within the cavern. For example, four one-inch diameter pipes 41, 42, 43 and 44 are suspended within eductor pipe 17, one pipe, 41, terminating at its lower end at a point adjacent the top or roof of cavern 10, pipe 42 terminating 80 feet below the lower end of pipe 41, pipe 43 terminating 160 feet below the lower end of pipe 41, and the fourth pipe 44 terminating 240 feet below the lower end of pipe 41, this last pipe, 44, terminating at a point above the lower end of eductor pipe 17 and, as shown in the drawing, at a depth below interface 22.

The upper ends of the plurality of small diameter pipes 41–44 pass through stuffing boxes or the like at the upper end of eductor pipe 17. Each of pipes 41–44 are in fluid communication with the annulus 18 between eductor pipe 17 and casing 14. For example, pipes 41, 42, 43 and 44 are connected to pipes 45, 46, 47, and 48, respectively, all of the latter pipes being connected to pipe 49 which in turn communicates with annulus 18 via product line 26. Pipes 45, 46, 47, 48, and 49 are provided with suitable flow control valves, such as solenoid operated valves 50, 51, 52, 53 and 54, respectively.

Pipes 41, 42, 43, and 44 are provided with suitable flow control valves, such as solenoid operated valves 56, 57, 58 and 59, respectively, at a point upstream of the connections between pipes 41–44 and pipes 45–48. Pipe 41, at a point downstream of valve 56, is connected through pressure sensing line 60 to a large-scale differential pressure gauge 61, the latter for example having a pressure range of 0–100 p.s.i. Differential pressure gauge 61 also communicates through pressure sensing line 63 with annulus 18 via product line 26. Pressure sensing lines 60 and 63 are provided with similar solenoid operated valves 64 and 66, respectively. Pipes 41–44 are similarly connected, at points upstream of valves 56–59, through pressure sensing line 67 to a small-scale differential pressure gauge 68, the latter for example having a pressure range from 0–25 p.s.i. Differential pressure gauge 68 is also connected through pressure sensing line 69 to annulus 18 via product line 26. Pressure sensing lines 67 and 69 are similarly provided with solenoid operated valves 71 and 72, respectively.

Solenoid operated valves 50–54, 64 and 66 are operatively connected and controlled by suitable switch mechanism 73. Solenoid operated valves 56–59, 71 and 72 are operatively connected to the circuitry associated with differential pressure gauge 61. Although shown at different elevations for purposes of clarity, valves 50–54, 56–59, 64, 66, 67 and 69 are preferably disposed at about the same elevation.

Before describing in detail the circuitry of FIGURE 2, it is believed wise at this point to briefly describe the operation of FIGURE 1 in locating interface 22.

In operation, eductor pipe 17 is normally filled with brine. When it is desired to determine the level or depth of interface 22, switch mechanism 73 is actuated so as to open normally-closed valves 50–54 and close normally-open valves 64 and 66. This permits pipes 41–44 to be filled with product from annulus 18, pipes 41–43 being completely filled with product and pipe 44 being completely filled with product down to a point adjacent interface 22. The product 21 is caused to flow into pipes 41–44 under its own pressure and displace brine therefrom, the displaced brine and any excess product being bled via brine line 31, if necessary. Closing of valves 64 and 66 permits differential pressure gauge 61 to bleed and return to zero. After a suitable time delay, e.g., 3 minutes, sufficient to fill pipes 41–44 with product as described, valves 50–54 are closed and valves 64 and 66 are opened. As a result, differential pressure gauge 61 will register the differential pressure between the lower end of pipe 41 (at the top of the storage space) and the interface level 22. The mechanism of differential pressure gauge 61 will then cause the opening of one of valves 56–59, and also cause the opening of valves 71 and 72. That valve among valves 56–59 which is opened will be the valve of that pipe among pipes 41–44 which terminates the closest above interface level 22. For example, with the interface level 22 as shown in the drawing, pipe 43 has its lower end closest above interface level 22 and accordingly its valve 58 is opened. Thus, differential pressure gauge 68 will sense and measure the differential pressure between the lower end of pipe 43 and interface 22, this differential pressure reading being much smaller and more accurate than that determined by differential pressure gauge 61. The error in reading differential pressure gauge 68 is relatively many times smaller than the error in reading differential pressure gauge 61 since the former has a much smaller pressure range, e.g., 0–25 p.s.i., whereas the latter differential pressure gauge has a larger pressure range, e.g., 0–100 p.s.i. From a knowledge of the known length of pipe 43 and the registered pressure of small differential pressure gauge 68, the interface level or depth can be readily and accurately determined.

Referring now in detail to FIGURE 2, the various valves of FIGURE 1 are illustrated together with associated circuitry for controlling and operating the same according to a preferred embodiment of this invention. The legends "N.C." and "N.O.," adjacent the various solenoid operated valves, indicates whether such valves are normally-closed or normally-open, respectively.

Time delay switch generally designated 76 operatively controls the opening and closing of valves 50–54, 64 and 66. Switch 76 comprises a spring-biased open switch button 77 having a contactor bar 78 adapted to come into contact and close circuit 79, the latter being provided with time delay heater 81 which is positioned adjacent bimetallic strip 82. The upper end of bimetallic strip 82 is provided with latch 83 to retain contactor bar 78 in its lower position 84 where it completes circuit 79 until heater 81 sufficiently heats bimetallic strip 81 to cause latch 83 to move to the left and release contactor bar 78 to break circuit 79. With contactor bar 78 in its lower position 84, circuit 85 is closed, and valves 50–54 are opened to permit the filling of pipes 41–44 of FIGURE 1 with product, and valves 64 and 66 are closed to permit differential pressure gauge 61 to bleed to zero.

The inadvertent or non-sequential operation of time delay switch 76 is prevented by manually-operated switch 86, the latter comprising a pivotal bar 87 and contactor bar 88. Manually-operated switch 86 is illustrated in its "On" position, and in this position pivotal bar 87 prevents contactor bar 78 of time delay switch 76 from completing circuit 79. Thus, before time delay switch 76 can be actuated, it is necessary to first move manually-operated switch 86 to its "Off" position, shown by broken line 89. After manually operated switch 86 is moved to its "Off" position, time delay switch 76 can be actuated, after which switch 86 is moved to its "On" position. After the predetermined time delay, e.g., 3 minutes, of time delay switch 76 has expired, and latch 83 moved to the left, contactor bar 78 will jump upward, pushing upward the pivotally moving arm 87 of switch 86, thereby permitting the breaking of circuit 79 and circuit 85.

After said time delay, valves 50–54 are closed and valves 64 and 66 are opened. This permits differential pressure gauge 61 to register the differential pressure between the lower end of pipe 41 and interface 22 of FIGURE 1. This differential pressure causes indicator contactor needle 91 of differential pressure gauge 61 to move and contact one of the conductor bars 92, 93, 94 and 96 of differential pressure gauge 61. For example, with the interface 22 of FIGURE 1 at the level shown, the lower end of pipe 43 is closest thereto, and needle 91 will move clockwise and come into electrical contact with bar 94 of differential pressure gauge 61, as shown by broken line 97 in FIGURE 2. With needle 91 in position 97, and manually-operated switch 86 in the "On" position shown, time delay circuit generally designated 98 is completed. The latter comprises a solenoid operated switch 99, normally spring-biased open circuit 100 and heater 101, the latter being adjacent to bimetallic strip 102. When time delay circuit 98 is actuated, solenoid switch 99 having been closed, circuit 100 is completed, causing heater 101 to heat bimetallic strip 102. A predetermined time must elapse before bimetallic strip 102 is sufficiently heated to cause its deflection. Thus, the sweeping of indicator contactor needle 91 across contactor bars 92 and 93 will not cause the opening of solenoid operated valves 56, 57, for reasons apparent from the following discussion.

Bimetallic strip 102 is associated with switches 103, 104, the latter separated by insulator 106. After the time delay of time delay circuit 98 has elapsed, bimetallic strip 102 will be sufficiently heated to cause its deflection to the right and close switches 103, 104. When switch 104 is closed, the circuit energizing one of solenoid valves 56–59 is energized causing the opening thereof. With the interface 22 of FIGURE 1 closest to the end of pipe 43, valve 58 will be opened. Simultaneously, closing of switch 103 causes the opening of solenoid valves 71, 72. With valves 71 and 72 opened, and one of valves 56–59 opened, the differential pressure gauge 68 of FIGURE 1 is able to sense the differential pressure between the interface and that pipe having its lower end closest thereto, i.e., pipe 43.

Differential pressure gauge 68 thus readily and accurately determines the differential pressure between the interface and the lower end of that pipe closest thereto. This differential pressure reading, together with the known length of the pipe depending within the cavern are then used to determine the interface level.

After the interface level determination has been made switch 86 is turned off, bimetallic strip 102 will cool, breaking switches 103, 104 thereby allowing valves 58, 71 and 72 to close, and allowing differential pressure gauge 68 to bleed to zero. When it is desired to redetermine the interface level, for example after product has been withdrawn from the cavern, the above operation can be repeated and the new interface level determined.

As an example, assume an underground storage cavern is located with its top or roof about 2000 feet below ground level, with the bottom of the cavern being 300 feet deeper, and said cavern is provided with a 10¾ inch O.D. casing with a 7 inch O.D. eductor pipe and four one-inch O.D. pipes depending within the eductor pipe, the first of the latter pipes terminating at a point adjacent the roof of the cavern and the others terminating 80, 160, and 240 feet below the first, respectively, with the interface disposed at a level between the lower ends of two lowermost small diameter pipes. Assume a large scale differential pressure gauge having a range between 0 and 100 p.s.i., and a small scale differential pressure gauge having a range between 0 and 25 p.s.i. are employed. Proceeding according to the procedure of this invention, assume that the large scale differential pressure gauge records 49 p.s.i.; and the small scale differential pressure gauge is accordingly put into operation and registers 8.5 p.s.i. Assuming that the lower end of that pipe closest to the interface is 160 feet from the top of the cavern (or reference elevation), this distance plus that equivalent to the registered 8.5 p.s.i., or 34 feet, shows that the interface is located 194 feet below the known elevation of the cavern roof, or 2194 feet below ground surface.

If one had used the 49 p.s.i. differential pressure reading to locate the interface level, differential pressure gauge 61 having an accuracy of ±1%, with a specific gravity of 1.18 for brine and 0.58 for stored product, the interface level would be determined as 194 feet±2 feet; an error of two feet which could result in large errors in determining the amount of product stored.

Various modifications and alterations of this invention will become apparent to those skilled in the art, without departing from the scope and spirit of the invention, and it should be understood that this invention is not to be unduly limited to that set forth above and illustrated in the accompanying drawing.

I claim:

1. In a sealed underground storage cavern comprising a cavity having a relatively large diameter and an access bore having a relatively small diameter and extending from said cavity to the ground surface, said cavity containing in its lower portion a displacing liquid and in its upper portion a stored fluid lighter than and immiscible with said displacing liquid with an interface formed therebetween, a method of locating said interface, which comprises suspending a tubing within said access bore in such a manner that the lower open end of said tubing communicates with said displacing liquid and is initially filled therewith, introducing a plurality of pipes into said tubing, the lower open ends of said pipes terminating at predetermined spaced points within said tubing, the first of said pipes terminating at a point adjacent the top of said cavity, filling said pipes with said stored fluid, measuring the pressure differential between the lower end of said first pipe and said interface, and as a result of said resulting differential pressure automatically measuring the pressure differential between said interface and the lower end of that pipe which terminates the closest above said interface, whereby the latter differential pressure can be used as an index of the location of said interface.

2. In the process of storing a relatively lighter fluid over an immiscible heavier liquid in a cavern, in which a casing extends from the surface of the ground into said cavern and is filled with said fluid, and a tubing extends from the surface of the ground into and is filled with said liquid, the process of determining the elevation of the interface of said fluid and liquid which comprises the steps of extending a plurality of pipes from the surface of the ground into said tubing to predetermined known elevations spaced from said interface, forcing some of said fluid into said pipes to displace said liquid therefrom, automatically determining which of said pipes terminates closest above said interface, and measuring the differential pressure between the fluid in said casing and the fluid in that one of said pipes which terminates closest above said interface, whereby the latter differential pressure can be used as an index of the location of said interface.

3. In a sealed underground storage cavern comprising a cavity having a relatively large diameter and an access bore having a relatively small diameter and extending from said cavity to the ground surface, said cavity containing in its lower portion a displacing liquid and in its upper portion a stored liquid lighter than and immiscible with said displacing liquid with an interface formed therebetween, a method of locating said interface, which comprises suspending a tubing within said access bore and cavity in such a manner that the lower open end of said tubing is located at a point below said interface, suspending a plurality of small diameter pipes within said tubing, the lower open ends of said pipes terminating at known progressively deeper elevations within said tubing with the first of said pipes terminating adjacent the top of said cavity and the other of said pipes terminating therebelow, said cavern being operated so that the elevation of said interface normally varies between the elevation just below said end of said first pipe and the elevation just below the end of the lowermost of said other pipes, allowing communication between the upper ends of said pipes and the annulus formed between said tubing and access bore so as to pass said stored liquid from said annulus to said pipes and displace said displacing liquid therefrom, preventing said communication after said pipes are filled with said stored liquid, measuring the pressure differential between said first pipe and said annulus, and using the resulting differential pressure reading to automatically measure the differential pressure between said interface and that one of said other pipe which terminates closest above said interface, whereby said last-mentioned differential pressure can be used as an index together with the known length of said one pipe of the location of said interface.

4. The method according to claim 3 wherein said cavity is located in and defined by a salt formation, said displacing liquid is brine, and said stored liquid is liquefied petroleum gas.

5. In a sealed underground storage cavern comprising a cavity having a relatively large diameter and an access bore having a relatively small diameter and extending from said cavity to the ground surface, said cavity containing in its lower portion a displacing liquid and in its upper portion a stored fluid lighter than and immiscible with said displacing liquid with an interface formed therebetween, and a tubing suspended within said access bore and defining therewith an annular space which communicates with the upper portion of said cavity, said tubing having a lower open end located at a point below said interface, a plurality of pipes suspended within said tubing and terminating at their lower open ends at progressively greater known depths therein, means to permit communication between the upper ends of said pipes and said annular space, and means to automatically determine the pressure differential between said interface and that one of said pipes which has its lower end closest above said interface.

6. In a sealed underground storage cavern comprising a cavity having a relatively large diameter and an access bore having a relatively small diameter and extending from said cavity to the ground surface, said cavity containing in its lower portion a displacing liquid and in its upper portion a stored fluid lighter than and immiscible with said displacing liquid with an interface formed therebetween, and a tubing suspended within said access bore and defining therewith an annular space which communicates with the upper portion of said cavity, said tubing having a lower open end located at a point below said interface, a plurality of pipes suspended within said tubing and terminating at their lower open ends at progressively greater known depths therein, the first of said pipes terminating at an elevation adjacent the top of said cavity and the other of said pipes terminating at progressively deeper elevations, means to permit communication between the upper ends of said pipes and said annular space, first differential pressure gauge means to measure a first pressure differential between said first pipe and said annular space, second differential pressure gauge means to measure a second pressure differential between said annular space and that one of said pipes which has its lower end closest above said interface, and means connected to said first and second differential pressure gauge means for automatically determining in response to said first differential pressure which said one of said pipes is to communicate with said second differential pressure gauge means for the purpose of measuring said second differential pressure.

7. In a sealed underground storage cavern comprising a cavity having a relatively large diameter and an access bore having a relatively small diameter and extending from said cavity to the ground surface, said cavity containing in its lower portion a displacing liquid and in its upper portion a stored fluid lighter than and immiscible with said displacing liquid with an interface formed therebetween, and a tubing suspended within said access bore and defining therewith an annular space which communicates with the upper portion of said cavity, said tubing having a lower open end located at a point below said interface, a plurality of pipes suspended within said tubing and terminating at their lower open ends at progressively greater known depths therein, the first of said pipes terminating at an elevation adjacent the top of said cavity and the other of said pipes terminating at progressively deeper elevations, first conduit means communicating the upper ends of said pipes with said annular space, first flow control valve means in said first conduit means, a first differential pressure gauge means, first and second pressure sensing lines communicating said first gauge means with first pipe and said annular space respectively, second valve means in said pressure sensing lines, a second differential pressure gauge means, third and fourth pressure sensing lines communicating said second gauge means with said pipes and said annular space respectively, third valve means in said last-mentioned pressure sensing lines, fourth valve means in said pipes, and time delay switch means operatively connected to said valves and said gauges to automatically perform the following sequence: open said first valve means and close said second valve means to fill said pipes with said stored liquid and bleed said first guage means to zero, close said first valve means and open said second valve means after said pipes are filled with said stored liquid and permit said first gauge to measure the differential pressure between said first pipe and said annular space, and open said third valve means and one of said fourth valve means in that said pipe having its lower end closest above said interface to measure the differential pressure between said annular space and the last-mentioned pipe.

8. The apparatus of claim 7 wherein said cavity is located in and defined by a salt formation, said displacing liquid is brine, and said stored liquid is liquefied petroleum gas.

9. The apparatus of claim 7 wherein said first gauge has a larger pressure range than that of said second gauge.

No references cited.